(12) United States Patent
Sridharan

(10) Patent No.: US 7,783,511 B2
(45) Date of Patent: Aug. 24, 2010

(54) SYSTEM AND METHOD FOR PLANNING A TOUR OF ACTIVITIES

(75) Inventor: Sriram Sridharan, Bangalore (IN)

(73) Assignee: SAP AG, Walldorf (DE)

( * ) Notice: Subject to any disclaimer, the term of this patent is extended or adjusted under 35 U.S.C. 154(b) by 1325 days.

(21) Appl. No.: 10/817,844

(22) Filed: Apr. 6, 2004

(65) Prior Publication Data

US 2005/0222886 A1 Oct. 6, 2005

(51) Int. Cl.
*G06F 9/46* (2006.01)
(52) U.S. Cl. .......................................................... 705/9
(58) Field of Classification Search ................ 705/8, 705/9
See application file for complete search history.

(56) References Cited

U.S. PATENT DOCUMENTS

| | | | | |
|---|---|---|---|---|
| 5,940,803 | A * | 8/1999 | Kanemitsu | 705/6 |
| 6,104,788 | A * | 8/2000 | Shaffer et al. | 379/93.17 |
| 6,311,191 | B1 * | 10/2001 | Retallick | 707/104.1 |
| 6,442,567 | B1 * | 8/2002 | Retallick et al. | 707/104.1 |
| 7,181,689 | B2 * | 2/2007 | Mock et al. | 715/703 |
| 7,212,983 | B2 * | 5/2007 | Redmann et al. | 705/6 |
| 7,343,312 | B2 * | 3/2008 | Capek et al. | 705/8 |
| 2003/0204474 | A1 * | 10/2003 | Capek et al. | 705/64 |
| 2003/0233285 | A1 * | 12/2003 | Liu et al. | 705/26 |
| 2004/0128215 | A1 * | 7/2004 | Florance et al. | 705/28 |
| 2006/0095331 | A1 * | 5/2006 | O'Malley et al. | 705/22 |
| 2007/0185744 | A1 * | 8/2007 | Robertson | 705/5 |

FOREIGN PATENT DOCUMENTS

| | | |
|---|---|---|
| DE | 101 26 527 A1 | 12/2002 |
| EP | 1 037 156 A1 | 9/2000 |
| WO | WO 02/25396 A2 | 3/2002 |
| WO | WO 0225396 A2 * | 3/2002 |

OTHER PUBLICATIONS

European Search Report dated Aug. 31, 2005.
SAP: "SAP Beverage"; SAP Solution Brief, 'Online! 2003, pp. 1-4, XP002340419 Retrieved from the Internet: URL:http://www.sap.com> 'retrieved on Aug. 10, 2005! *the whole document.
Microsoft: "Sales Force Automation" Microsoft Business Solutions—AXAPTA, 'Online! Jul. 4, 2003 pp. 1-6, XP002340421 Retrieved from the Internet: URL:http://whitepapers.techrepublic.com> 'retrieved on Aug. 10, 2005! *the whole document*.
SAP: "SAP Launches Direct Store Delivery Capability for the Beverage Industry" SAP—Press Release, 'Online! Oct. 23, 2002, pp. 1-1 X002340422 DE Retrieved from the Internet: URL:http://www.sap.com> 'retrieved on Aug. 10, 2005! *the whole document*.

(Continued)

*Primary Examiner*—Romain Jeanty
(74) *Attorney, Agent, or Firm*—Mintz, Levin, Cohn, Ferris, Glovsky and Popeo, P.C.

(57) ABSTRACT

A method and system for managing scheduled events facilitates the planning of a tour of activities. Customer information and appointment information is received. A tour of activities is planned based on the customer information, the appointment information, and planning drivers. A status is generated for the tour of activities, a particular activity, or a particular customer, and a summary is generated.

20 Claims, 15 Drawing Sheets

OTHER PUBLICATIONS

A.J. Morgan; S.A. Inks: "Technology and the Sales Force: Increasing Acceptance of Sales Force Automation" Industrial Marketing Management, 'Online! vol. 30, No. 5, Jul. 2001, pp. 463-472, XP002340423 US; retrieved from the internet: URL:http://www.sciencedirect.com> 'retrieved on Aug. 10, 2005! *Introduction, p. 463-5*.

R. Perkins: "Mobile Computing and the New Sales Force", The Sprint E-Solutions Whitepapers No. 8, 'Online! 2001, pp. 1-11, XP002340420 Retrieved from the Internet: URL:http://whitepapers.techrepublic.com> 'retrieved on Aug. 10, 2005! *the whole document*.

3COM: "Sales Force Automation"; 3COM—Technical Paper, 'Online! Aug. 1998, pp. 1-8 XP002340424, US, Retrieved from the Internet: URL:http://whitepapers.techrepublic.com> 'retrieved on Aug. 10, 2005! *the whole document*.

Cisco Systems: "What You Need to Implement a Sales-Force Automation Solution"; Cisco Systems—Implemention Roadmap, 'Online! 2001, pp. 1-6, XP002340425, US, Retrieved from the Internet: URL:http://www.cisco.com>, 'retrieved on Aug. 10, 2005! *the whole document*.

Spirent Communications: "Expert Field Force Automation and Its Effect on Field Service"; Spirent Communications—White Paper, 'Online! 2003, pp. 1-4, XP002340426, US, retrieved from the internet: URL:http://whitepapers.techrepublic.com>, 'retrieved on Aug. 10, 2005! *the whole document*.

B. Swissler: "Look Ma, No Hands", Field Force Automation, 'Online! Mar. 2001, pp. 1-3, XP002340427, US, Retrieved from the Internet: URL:http://www.mdsi-advantex.com/files/Article_Reprints/FFA_March_2001.pdf> 'retrieved on Aug. 10, 2005! *the whole document*.

* cited by examiner

FIG. 9

SEARCH

1100

DESCRIPTION
PERSON RESP.
ORIGINAL SYSTEM
CAMPAIGN

☐ READ ONLY TARGET HEADERS
⊙ ALL TARGET HEADERS
○ NOT LINKED
○ LINKED TO CAMPAIGNS

1120

[SEARCH] [CLEAR]

TARGET HEADER

| DESCRIPTION | PERSON RESP. | ORIGINAL SYSTEM | READ ONLY |
|---|---|---|---|
| ▲ ALAIN GAUTHIER T GR | | | ☐ |
| TEST YANN DU 1805 | | | ☐ |
| NEUE SMAGO TARGETLIST | | MOBILE | ☐ |
| NEUE SMAGO TARGETLIST | | MOBILE | ☐ |
| NEUE SMAGO TARGETLIST | | MOBILE | ☐ |
| TARGETLIST 6 BP | | | ☐ |

1110

[SELECT] [CANCEL]

SYSTEM AND METHOD FOR PLANNING A TOUR OF ACTIVITIES

This invention relates generally to methods and systems for managing scheduled activities, and more specifically to methods and systems for scheduling, monitoring, and managing appointments.

BACKGROUND

The market for goods, perpetuated by the globalization of the world's economy, has become more and more competitive. Consequently, salespeople are faced with stiffer competition for the products they sell. Typically, a salesperson covers a specific territory and handles a specific product line. Appropriate customers located in that territory are often visited by many different salespeople representing similar products. Therefore, the efficient use of a salesperson's time can often mean the difference between meeting quotas and falling short of sales goals.

A salesperson usually schedules appointments with customers for a specific time and day. For a salesperson with a large territory, planning a set of appointments to maximize his sales effort is often a difficult task. Typically, the salesperson makes telephone calls to customers and potential customers in a specific area to determine if they are available for a visit during the time period the salesperson has set aside. Those customers that are available are scheduled manually by the salesperson, and those that are not available must wait until the salesperson visits that area again. Preparing a schedule of sales appointments can be difficult because customers are often only available during specific periods of time. To fit a list of ten or twenty customers into an appointment schedule manually can be an intimidating task.

With the advent of electronic calendars, PDAs, and cellular telephones, a salesperson can more easily plan and execute a sales trip to visit multiple customers. However, the planning process, while enhanced by these electronic tools, is usually done manually by an individual salesperson. This manual planning of appointments not only takes up valuable time, but also results in inefficient use of sales efforts. Often, a salesperson does not use the proper criteria in planning a sales trip, instead focusing on factors such as convenience. Moreover, information about customers and prior sales trips is not utilized properly to plan efficient sales efforts. It is difficult to monitor and track the information that is obtained from customers during sales visits. Often, different salespeople with different information do not communicate effectively to plan effective sales trips. As a result, sales efforts are not efficiently planned.

SUMMARY

A method consistent with the present invention includes receiving customer information and appointment information; planning a tour of activities based on the customer information, the appointment information, and a planning driver; generating a status of the tour of activities, a status of an activity, or a status of a customer; and reporting a summary of the tour of activities.

A system consistent with the present invention includes a processor and memory coupled to the microprocessor. The microprocessor is operable to receive customer information and appointment information; plan a tour of activities based on the customer information, the appointment information, and planning drivers; generate a status of the tour of activities, a status of an activity, or a status of a customer; and report a summary of the tour of activities.

An article of manufacture consistent with the present invention contains instructions for managing scheduled events. The instructions are capable of causing a processor to: receive customer information and appointment information; plan a tour of activities based on the customer information, the appointment information, and a planning driver; generate one of a status of the tour of activities, a status of an activity, and a status of a customer; and report a summary one of the tour of activities, the activity, or the customer.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings:

FIG. 9 is a computer screen shot of one possible user interface consistent with the present invention.

FIG. 11 is a is a computer screen shot of a target header window interface consistent with the present invention.

FIG. 19 is a is a computer screen shot of email window interface consistent with the present invention.

DETAILED DESCRIPTION

The following description refers to the accompanying drawings in which, in the absence of a contrary representation, the same numbers in different drawings represent similar elements. The implementations in the following description do not represent all implementations consistent with the claimed invention. Instead, they are merely some examples of systems and methods consistent with the invention.

Figure 1:
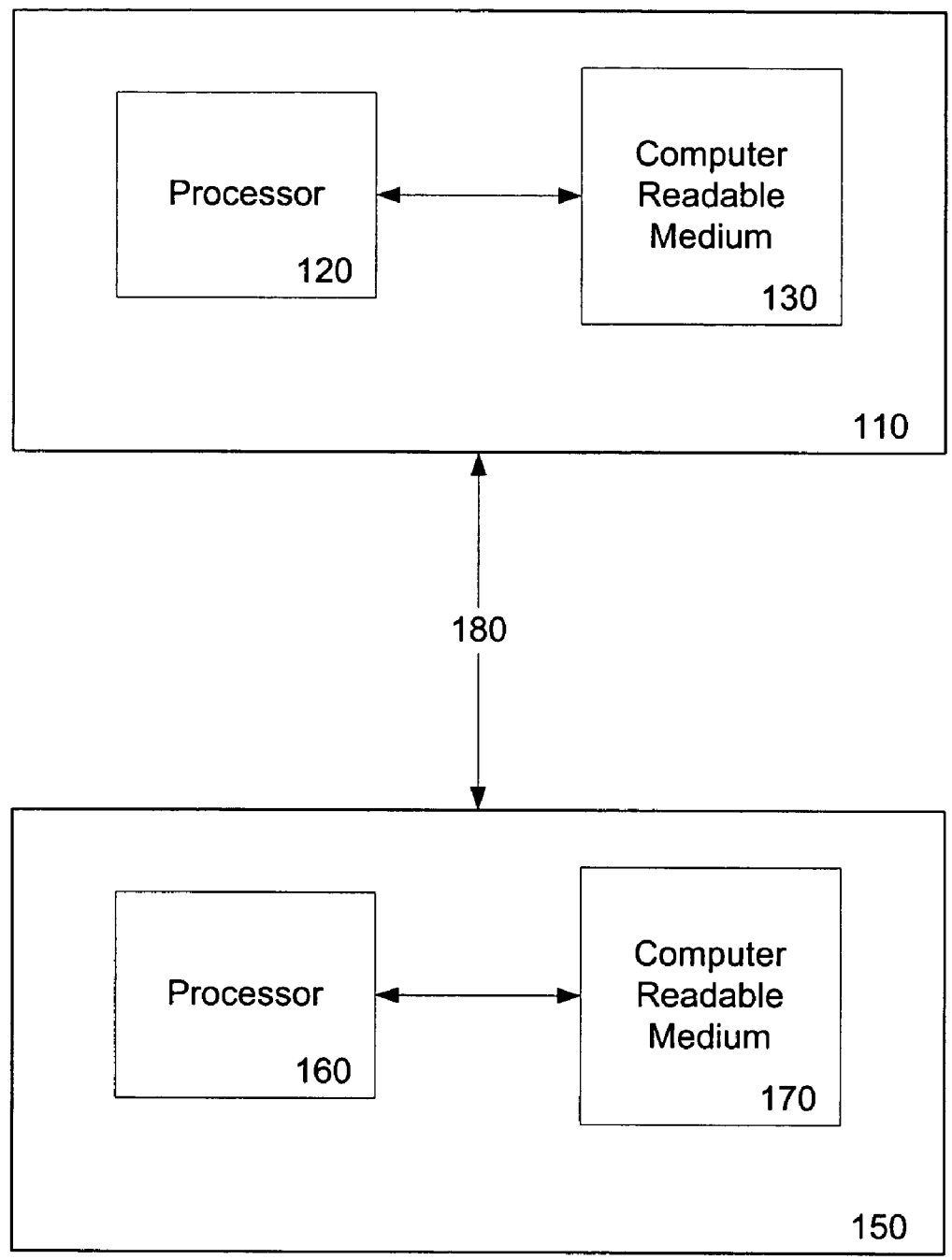
FIG. 1 is a block diagram of a system consistent with the present invention.

FIG. 1 is an illustration of a system for managing scheduled events consistent with the present invention. In this exemplary system, computer device 110 comprises a processor 120 and computer readable medium 130. Processor 120 accesses computer readable medium 130 to perform operations consistent with the present invention. Computer device 110 may be any type of computing platform, such as a desktop, laptop computer, notebook computer, PDA, handheld computer, or pocket computer. Computer device 110 may be a general-purpose computer running a computer program or a specially constructed computing platform for carrying-out the operations described below.

Likewise, computer device 150 comprises a processor 160 and computer readable medium 170. Processor 160 accesses computer readable medium 170 to perform operations consistent with the present invention. Computer device 150 may be any type of computing platform, such as a desktop, laptop computer, notebook computer, PDA, handheld computer, or pocket computer. Computer device 150 may be a general-purpose computer running a computer program or a specially constructed computing platform for carrying-out the operations described below.

Furthermore, the two computer devices, 110 and 150, may be located remotely from each other, for example, when a sales person is on the road, so that data can be shared between the two computer devices. Similarly, one computer device may contain the instructions to perform operations consistent with the invention, while the other computer device may act as a dumb terminal. In this manner, one computer device may act as a central device distributing appointment schedules and information to another computer device.

Similar to computer device 110, computer device 150 may be implemented by a general-purpose computer running the appropriate computer programs stored in the computer, or a specially constructed computing platform. Computer device 150 may also be implemented with a wide variety of components including, a central processing unit, an I/O interface, a network interface, and a display.

Computer device 110 communicates with computer device 150 over an interface 180. Computer device 110, having processor 120, may transfer data objects and messages via interface 180 (which can be any conventional interface) by direct connections or other communication links. Alternatively, computer device 110 can be part of a network such as a telephone-based network (such as a PBX or POTS), a local area network (LAN), a wide area network (WAN), a dedicated intranet, and/or the Internet. In this way, computer device 110 may be located near or far from computer device 150.

Computer readable medium 130, like computer readable medium 170, may be implemented with various forms of memory or storage devices, such as read-only memory, random access memory, magnetic memory, or external devices. Typically, computer readable medium 130 stores instructions for performing operations consistent with the present invention.

Figure 2:
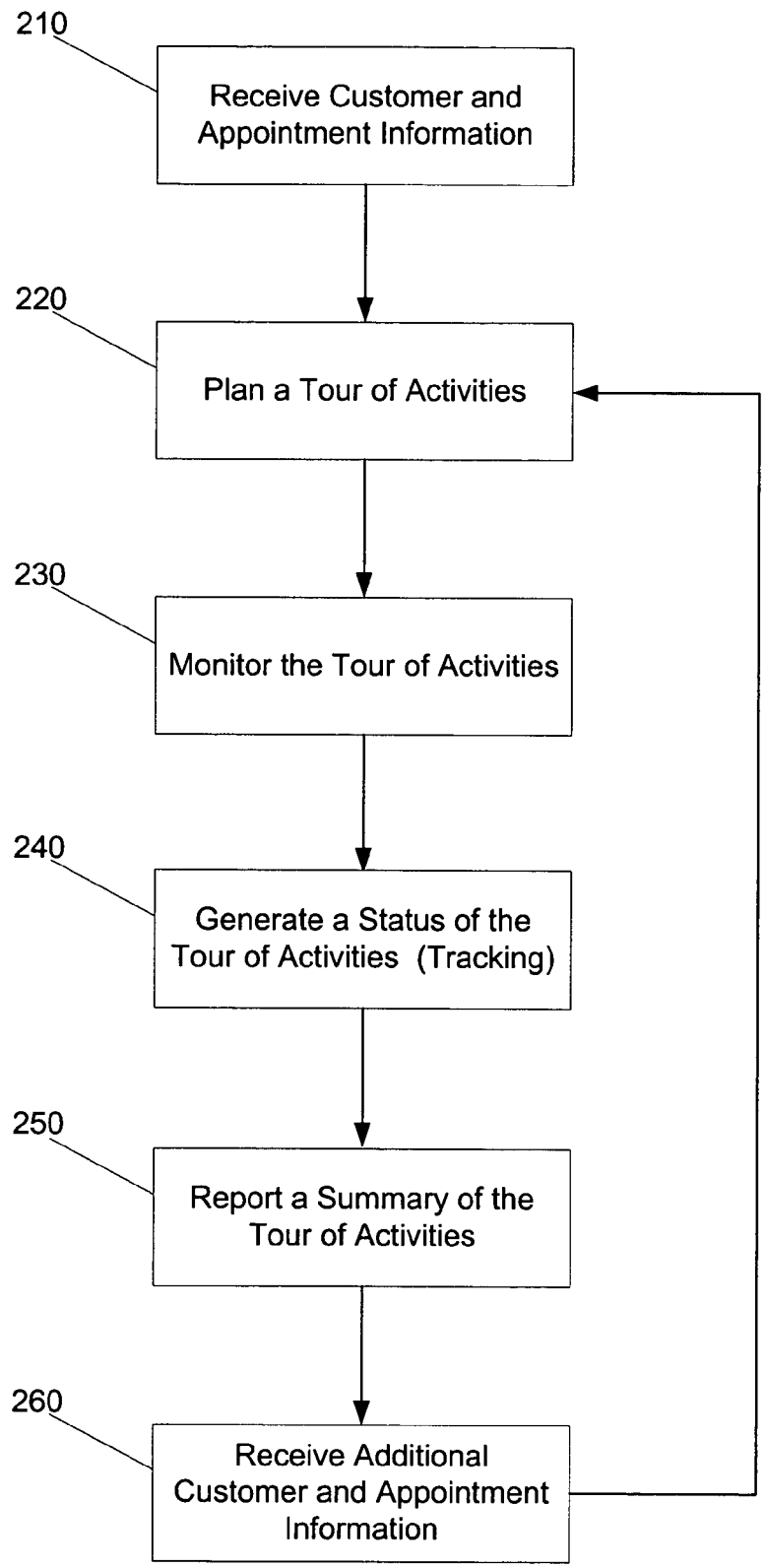
FIG. 2 is a flowchart of one possible operation of a method of managing scheduled events consistent with the present invention.

FIGS. 2-7 are flowcharts and diagrams providing more detail on the processes, which the system described above, or other systems, can carry out. FIG. 2 provides a general overview of a tour planning process consistent with the present invention. FIGS. 3-7 elaborate on the exemplary process of FIG. 2. Those skilled in the art will appreciate that the process flows may be implemented in a variety of fashions. Although these flowcharts illustrate most features of the processes, they may, for purposes of clarity, omit some features in the following text.

FIG. 2 is a flowchart of an exemplary operation of a method of managing scheduled events consistent with the present invention. FIG. 2 describes a process for creating a tour of activities, such as a schedule of appointments. A salesperson may wish to schedule activities with a set of customers over a finite period of time. For example, a salesperson may wish to make sales calls on eight different customers over a two-day period. In this manner, a tour of activities may generally be considered to be a schedule of appointments. Activities, such as sales appointments with customers, can be scheduled in a tour of activities. Activities can include meetings, appointments, conferences, gatherings, or any other activity that occurs in a finite period and may be attended by a person. A tour of activities is a schedule, agenda, timetable, list, plan, or mapping of activities. FIG. 2 depicts a method, which can be implemented on the system of FIG. 1, for creating an appointment schedule to accommodate the salesperson's needs.

A tour of activities may also include independent places or independent objects to be visited. In this manner, a tour of activities can be a schedule of places to visit during specified times. Also, a tour of activities can be a schedule of independent objects such as vending machines. In this manner, a tour of activities can be a schedule for visiting a group of vending machines or other objects that need to be serviced.

Initially, customer and appointment information is received (stage 210). This information may be used to plan a tour of activities, such as a schedule of sales appointments. Customer information may include data related to a single customer or a group of customers. For example, customer information for a single customer may include basic geographical information, such as the location of the customer's offices, and contact information, such as telephone numbers, fax numbers, email addresses, and the names and positions of the customer's employees. Further, customer information may include sales figures, product demand, shipments, and other sales related data.

Appointment information may include data related to a single scheduled activity or a group of scheduled activities. Alternatively, appointment information may include data related to activities that are yet to be scheduled. For example, activity information may include the duration of the activity, the starting and ending times for the activity, the nature of the activity, the type of activity, the salesperson responsible for the activity, the customer associated with the activity, and the location of the activity. Further, appointment information may include data about whether the activity is related to a specific campaign, promotion, or exception, the importance of the activity, and other quantitative and qualitative aspects of the activity.

This appointment data, like the customer data, may be stored in computer readable medium 130 and/or computer readable medium 170 of FIG. 1, a remote database, or any other storage medium so that it is accessible for planning a tour of activities.

A tour is planned based on customer information, appointment information and one or more planning drivers (stage 220). All or a subset of the customer information, appointment information and planning drivers may be used to plan a tour of activities. For example, a tour of activities may be planned using a subset of customer information, a subset of appointment information, and a single planning driver. Alternatively, any combination of this data, or other user-supplied data, may be used to plan a tour of activities, such as a schedule of sales appointments.

After tour planning stage 220, the system monitors the tour of activities, individual activities, or customers in monitoring stage 230. In status generation or tracking stage 240, the system generates a status of the tour of activities, an individual activity, or a customer. In reporting stage 250, the system may generate various reports on the tour of activities. Finally, in stage 260, the user may input additional customer or appointment information and a new tour of activities may be planned.

Figure 3:
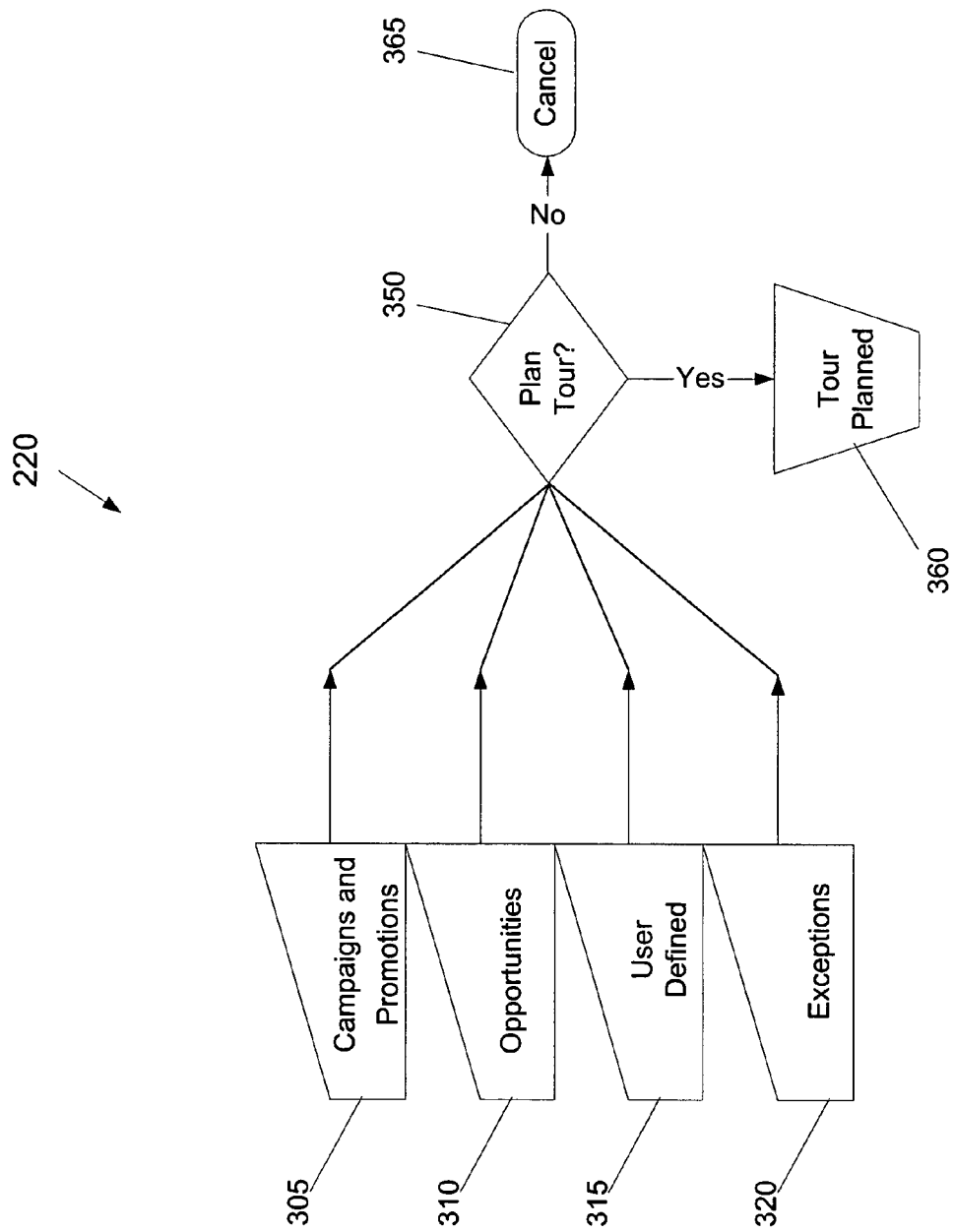
FIG. 3 is a flowchart of a planning process consistent with the present invention.

FIG. 3 is a diagram that further explains planning stage 220. FIG. 3 depicts four exemplary planning drivers—campaigns and promotions 305, opportunities 310, user defined 315, and exceptions 320. These planning drivers, along with customer and appointment information, are used to plan a tour of activities. Depending on the planning driver selected, a group of customers is defined.

Planning drivers serve as criteria that define a subset of customers for which a tour of activities may be planned. For example, the planning driver, campaigns and promotions 305, establishes criteria for customers that are appropriate for a particular sales campaign or promotion. A salesperson may wish to visit customers that would be a good fit for a particular sales campaign. The planning driver, campaigns and promotions 305, contains information or criteria that can be used to determine which set of customers the salesperson should visit for the sales campaign. Likewise, the planning driver, campaigns and promotions 305, may contain similar information or criteria that can be used to determine which set of customers the salesperson should visit for a particular sales promotion.

Utilizing the planning driver, campaigns and promotions 305, a group of customers may be selected for planning a tour of activities. In this manner, a user can select a subset of the customers that best fits the sales campaigns or promotions that are described in the criteria or information of campaigns and promotions 305. The system may then generate a list of customers that qualify for the sales campaign or promotion. This subset of customers may be selected from any group of customers. For example, a salesperson responsible for a particular geographic region may select a subset of customers based on campaigns and promotions 305 that are located in that geographic region.

The other planning drivers depicted in FIG. 3 provide similar functionality. The opportunities planning driver 310 may include information or criteria about particular sales opportunities that a company wishes to pursue. Opportunity planning driver 310 may be used to define a group of customers who qualify for the opportunity. In this manner, a user can select a subset of the customers that best fits the targeted opportunity that is described in the criteria or information of opportunities planning driver 310. The system may then generate a list of customers that should be pursued to fulfill the opportunity. This subset of customers may be selected from any group of customers. For example, a salesperson responsible for a particular geographic region may select a subset of customers based on the opportunities planning driver 310 that are located in that geographic region.

Likewise, a salesperson may define his own planning driver 315, which may include information or criteria of interest to the salesperson. User-defined planning driver 315 may be used to define a group of customers who qualify for user-specified criteria. In this manner, the user can select a subset of the customers that best fit the targeted criteria that is described in the user-defined planning driver 310. The user-defined planning driver may include any user-defined criteria related to a customer, activity, or tour. For example, a salesperson may create a user-defined planning driver based on the geographic location of customers. In this manner, a group of customers may be selected based on geographic criteria, such as their physical location. This list of customers may then be the target group for a tour of activities.

The exceptions planning driver 320 may include information or criteria about exceptions generated based on information obtained in the monitoring 230 or status generation stages 240. Exception planning drivers 320 may be used to define a group of customers who meet an exception. In this manner, a user can select a subset of the customers that best fit the criteria of the exception that is described in the exceptions planning driver 320. For example, one exception may be missed appointments. The system may use an exception planning driver based on missed appointments to generate a list of the customers whose appointments were missed. The system may then use this list of missed appointments to plan a tour of activities.

Planning drivers may also be based on other transaction information, such as sales orders, price quotations, or invoices. In this manner, transaction information can be used as a planning driver to plan a tour of activities. A planning driver based on transaction information can include prices and quantities of products sold during prior transactions with a particular customer or prospective sales information.

Figure 7:
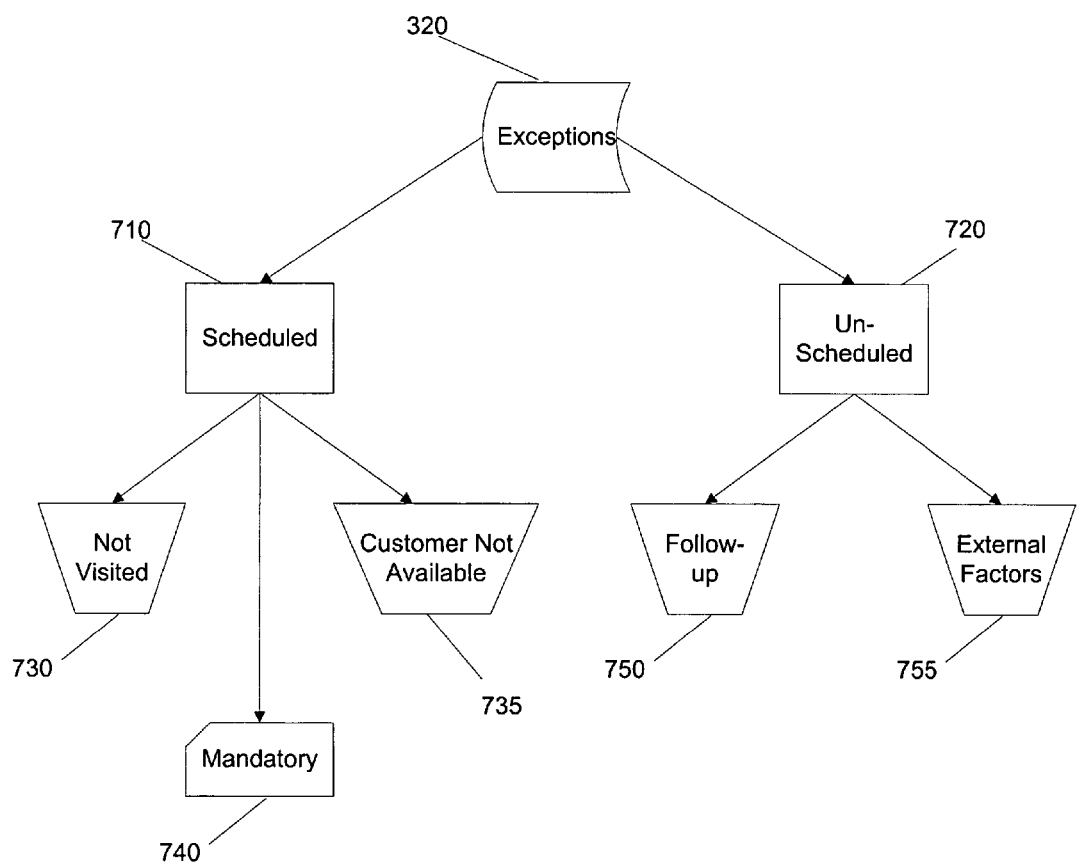
FIG. 7 is a diagram of exceptions that may be used in planning a tour of activities consistent with the present invention.

FIG. 7 depicts two exemplary types of exceptions 320, scheduled exceptions 710 and unscheduled exceptions 720. Scheduled exceptions 710 broadly comprise customers or appointments that were scheduled and missed for some reason. Scheduled exceptions 710 include scheduled customers who were not visited 730, scheduled customers who were not available for an appointment 735, and those scheduled customers who were missed and require a visit (mandatory) 740. In this manner, the system may further refine a broad category of scheduled exceptions 710, such as scheduled but missed customers, into subsets. A particular subset of missed customers may then be categorized by like attributes, such as those customers that were scheduled but unavailable 735.

Unscheduled exceptions 720 broadly comprise customers who were not scheduled for an activity or appointment. Unscheduled exceptions 720 include customers who were not scheduled for an activity but who should be visited (follow-up) 750 and customers who were not scheduled for an activity because of external factors 755. In this manner, the system may further refine a broad category of unscheduled exceptions 720, such as customers who were not scheduled for an activity or appointment, into subsets. The system may categorize by like attributes a particular subset of unscheduled customers, such as those unscheduled customers who were not scheduled for an activity because of external factors 755.

Exceptions may also be user-defined. For example, a salesperson who is responsible for a particular geographic region may create an exception based on geography. This exception could define a subset of customers who are located in a particular area of interest to the salesperson, such as a city in the salesperson's territory. This exception may then be used as a planning driver to plan a tour of activities for customers located in the city. Further, the salesperson could use the geographic exception along with other exceptions or planning drivers, customer information, and appointment information to plan a customized tour of activities. For example, if a salesperson wishes to support a sales campaign in a particular city in the span of a week, he may input the geographic exception as a planning driver, the campaign planning driver, and other customer and appointment information into the tour planning system. The system may then plan an appropriate tour for the salesperson.

The selection of a subset of customers based on an exception may be performed by an algorithm that optimizes the match between customer information and criteria defined by the planning driver. Any of a number of such optimizing algorithms, such as linear regression or least mean square algorithms, are widely available and known to those of skill in the art. Alternatively, a simple matching algorithm that compares the criteria of a planning driver to customer and appointment information may be employed.

The algorithm may generate a complete list of customers that fit the planning driver and then a salesperson may manually select the customers he wishes to visit from that list. For example, a list of twenty customers that satisfy a particular planning driver may be generated. A salesperson may then select ten of these twenty customers. A tour of activities may then be planned with these ten selected customers.

The tour of activities or appointment schedule generated in stage 220 is monitored in stage 230. The system may monitor any of a number of attributes. For example, the user may monitor a planned tour of activities for completeness, for compliance with planning drivers, or for exceptions. In this manner, information can be obtained to determine the status of a tour of activities.

Likewise, the system may monitor the individual appointments planned as a part of a tour of activities. The system may then use the information obtained from monitoring activities to develop a status for the activities. For example, if a scheduled appointment is missed, that information can be used to generate an exception. The exception (the information that the appointment was missed) may be useful in determining further action to take for the missed customer.

Likewise, the system may monitor the individual the customers with whom appointments have been scheduled as a part of a tour of activities. The system may then use the information obtained from monitoring customers to develop a status for the customers. For example, if a scheduled appointment is missed, that information can be used to generate an exception. The exception (the information that the customer was missed) may be useful in determining further action to take for the missed customer.

Figure 4:
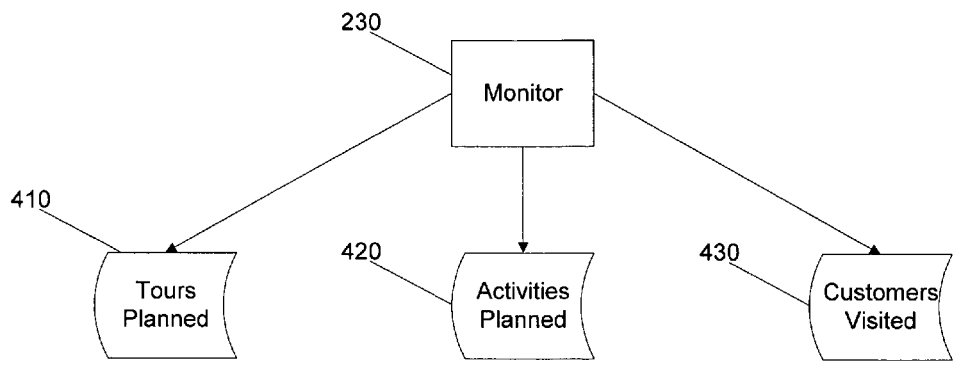
FIG. 4 is a flowchart of a monitoring process consistent with the present invention.

FIG. 4 elaborates on monitoring stage 230. Monitoring can be performed on planned tours 410, planned activities 420, and customers visited 430. The system may monitor any of a number of attributes. For example, the system may monitor a planned tour of activities 410 for completeness, for compliance with planning drivers, or for exceptions. Likewise, the system may monitor a planned activity 420 for completeness, for compliance with planning drivers, or for exceptions. Customers visited 430 may also be monitored for various indicators of status.

The system can then use the information gathered from monitoring a tour of activities, individual activities, or individual customers to generate a status (stage 240). Generating a status may also be referred to as tracking. The system may generate a status for a planned tour of activities (for example, the status of the tour as complete or incomplete), for an individual planned activity (again, for example, the status of the activity as complete or incomplete), or for an individual customer (for example, the status of the customer as visited or not visited). Any number of status variables may be associated with tours, activities, and customers. Moreover, the status variables may be related (for example, an activity that was not completed in a tour means the status of the tour is incomplete) or independent (for example, a tour may have the status of complete, while a customer who was not a part of that tour may be flagged for a follow-up opportunity).

Figure 5:
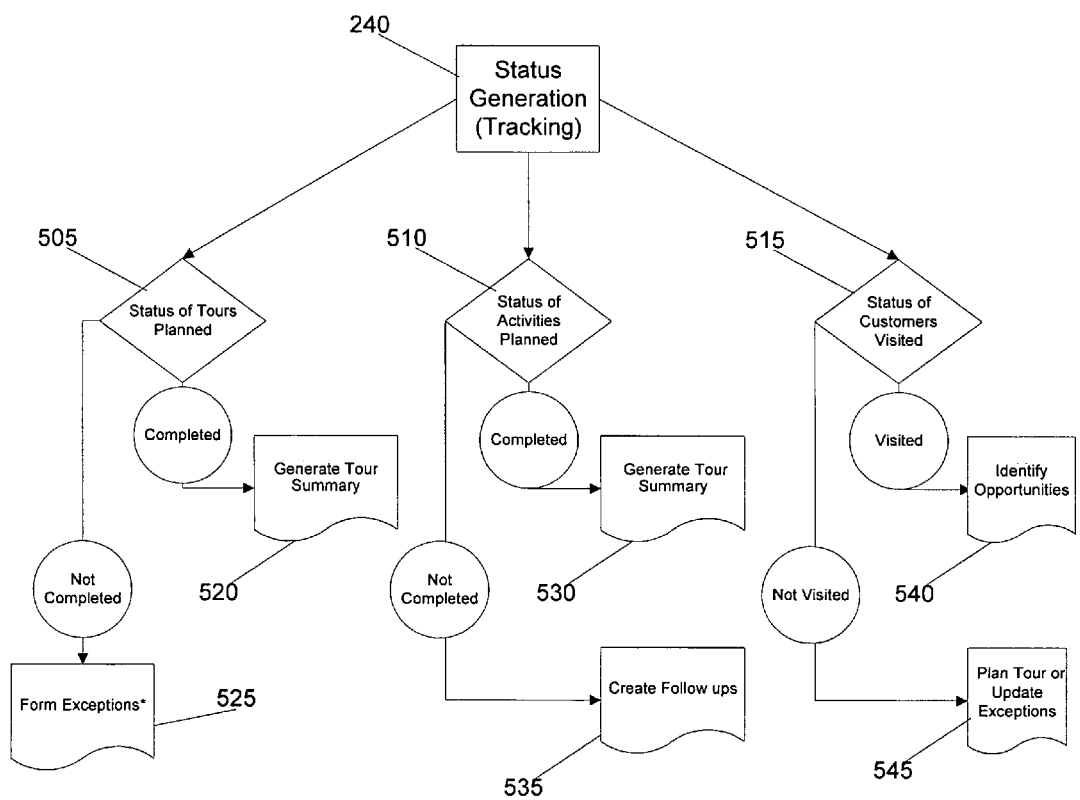
FIG. 5 is a flowchart of a status generation or tracking process consistent with the present invention.

FIG. 5 elaborates on status generation or tracking stage 240. The system may use the information obtained from monitoring activities to develop a status for an individual activity. For example, if a scheduled appointment is missed, that information can be used to generate a status. The value of the status variable (the information that the appointment was not completed) may be useful in creating an exception or reporting a summary.

In FIG. 5, three exemplary status variables are depicted. These status variables hold values that are generated from information obtained from monitoring planned tours 410, monitoring planned activities 420, or monitoring customers visited 430. These status variables may be Boolean variables or have numerous different values. A status variable indicates the status, characteristic, or other information related to a particular tour, activity, or customer. The status variables thus hold the results of the status generation or tracking process.

The values of the status variables are determined by the status generation or tracking process, which for example, may be implemented by an algorithm that uses monitored information to ascertain values for status variables. Information about whether a planned activity was completed may be gathered from monitoring the planned activity. That information may then be used to determine the value of the status variable (i.e. whether the activity was completed or not).

In FIG. 5, a variable associated with the status of planned tours 505 has the values "completed" (indicating that the activities that comprise a tour have all been completed) and "not completed" (indicating that at least one of the activities that comprise the tour has not been completed). The system may use information obtained from monitoring planned tours 410, monitoring planned activities 420, or monitoring customers visited 430 to determine the value of the variable associated with the status of planned tours 505.

The system may take further action based on the value of the status variable. For example, if the value of the variable associated with the status of planned tours 505 is "completed," then a summary of the tour may be generated 520. If the value of the variable associated with the status of planned tours 505 is "not completed," then the system may form exceptions indicating why the tour was incomplete 525. These exception may include information about the customers that were missed during the tour. The system may then plan a new tour of activities with these exceptions (missed customers) as a planning driver.

Likewise, a variable associated with the status of a planned activity 510 has the values "completed" (indicating that the activity has been completed) and "not completed" (indicating that the activity has not been completed). The system may use information obtained from monitoring planned tours 410, monitoring planned activities 420, or monitoring customers visited 430 to determine the value of the variable associated with the status of a planned activity 510.

The system may take further action based on the value of the status variable. For example, if the value of the variable associated with the status of a planned activity 510 is "completed," then a summary of the tour may be generated 530. If the value of the variable associated with the status of a planned activity 510 is "not completed," then the system may create a list of follow-up activities 535. The salesperson may then conduct follow-up activities to complete the customer appointments. The system may also use an exception based on follow-up activities as a planning driver to plan a tour of activities. In this manner, a tour of activities that includes follow-up activities may be planned.

Similarly, a variable associated with the status of a visited customer 515 has the values "visited" (indicating that the customer has been visited) and "not visited" (indicating that the customer has not been visited). The system may use information obtained from monitoring planned tours 410, monitoring planned activities 420, or monitoring customers visited 430 to determine the value of the variable associated with the status of a visited customer 515.

The system may take further action based on the value of the status variable. For example, if the value of the variable associated with the status of a visited customer 515 is "visited," then the system may identify additional sales opportunities for that customer 540. Identified opportunities may include opportunities to sell another product to an existing customer or a sales lead for a new customer. The system may use an exception based on these opportunities as a planning driver to plan a responsive tour of activities. If the value of the variable associated with the status of a visited customer 515 is "not visited," then the system may plan a subsequent tour including that customer or update exceptions 545. An exception may be based on customers that were not visited or missed. The system may then plan a new tour of activities with this exception (missed customers) as a planning driver.

After the status information is generated, a the system may produce a report summarizing the tour of activities 250. This report may summarize the status variables, planning drivers, customer information, appointment information, and exceptions for a tour of activities, an individual activity, or an individual customer. The report may also be customizable.

Figure 6:
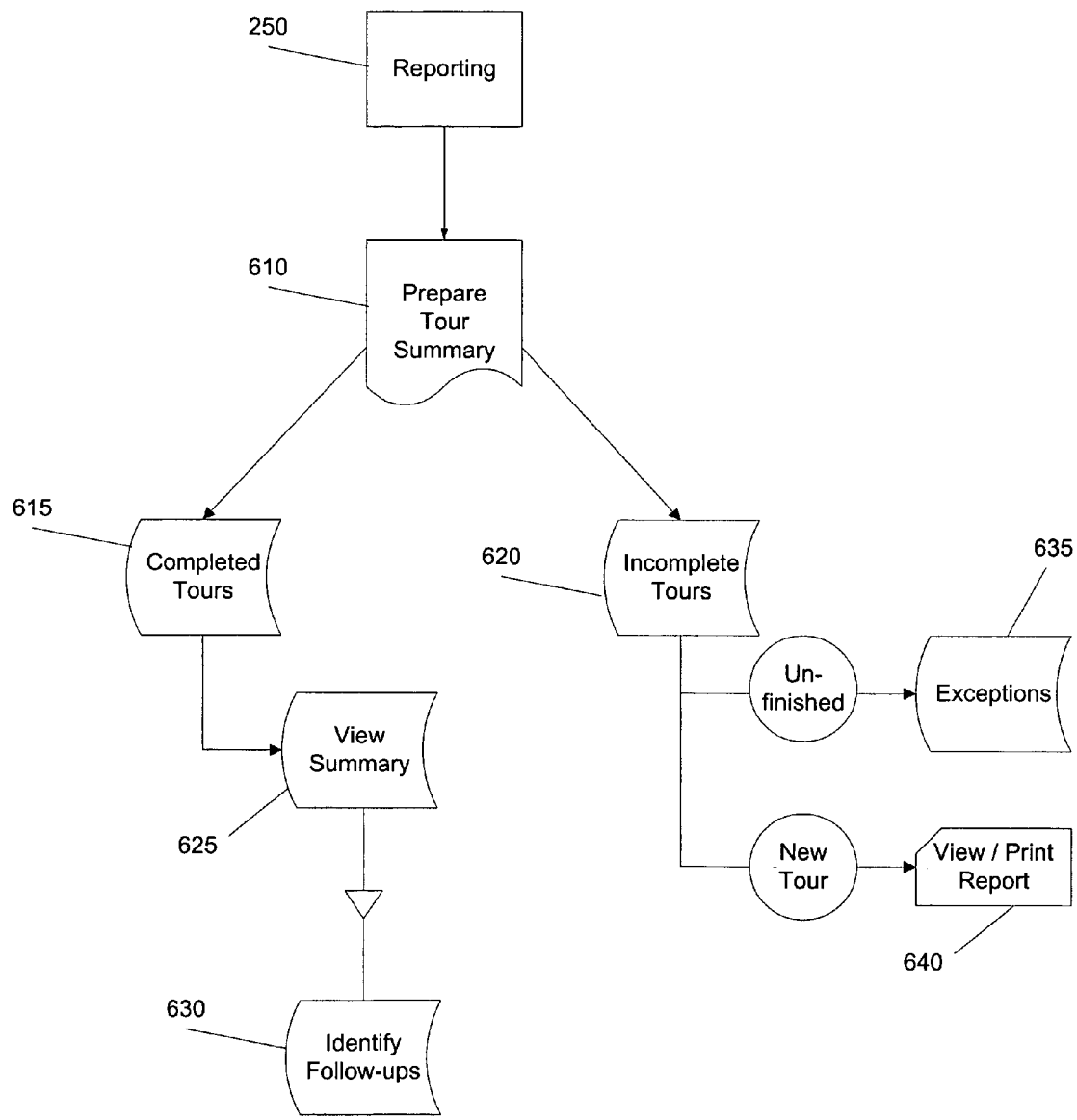
FIG. 6 is a flowchart of a reporting process consistent with the present invention.

FIG. 6 further elaborates on the reporting stage 250. The system may prepare a summary of a tour of activities 610 for completed tours 615 or incomplete tours 620. A summary that is prepared for a completed tour 615 may be viewed 625 and follow-up opportunities may be identified 630. A list of follow-up opportunities may be included in the summary itself or may be generated manually by looking at the summary. A summary that is prepared for an incomplete tour 620 may include a list of exceptions 635. For example, if a tour was not finished, a list of exceptions, which may include missed customers or missed appointments, can be generated and summarized in a report 635. Further, a summary of a new tour that not yet begun may be viewed and printed 640. In this manner, a salesperson can view a tour that he intends to take at some point in the future.

After the first iteration of tour planning, the system may receive additional customer information and additional appointment information and plan a revised tour of activities (stage 260). In this manner, data produced during the monitoring 230 and status generation 240 stages may be used to refine a tour of activities or plan a new tour of activities. The additional customer information and additional appointment information may be limited to data produced during the monitoring 230 and status generation 240 stages or it may include additional user-supplied information. For example, the system may plan a subsequent tour of activities based on exceptions encountered during a previous tour. An exception may be a missed appointment, unavailable customer, or follow-up opportunity. The system may then plan a subsequent tour of activities to include the customers that were unavailable, the appointments that were missed, or the follow-up opportunities that were generated during a previous tour.

Figure 8:
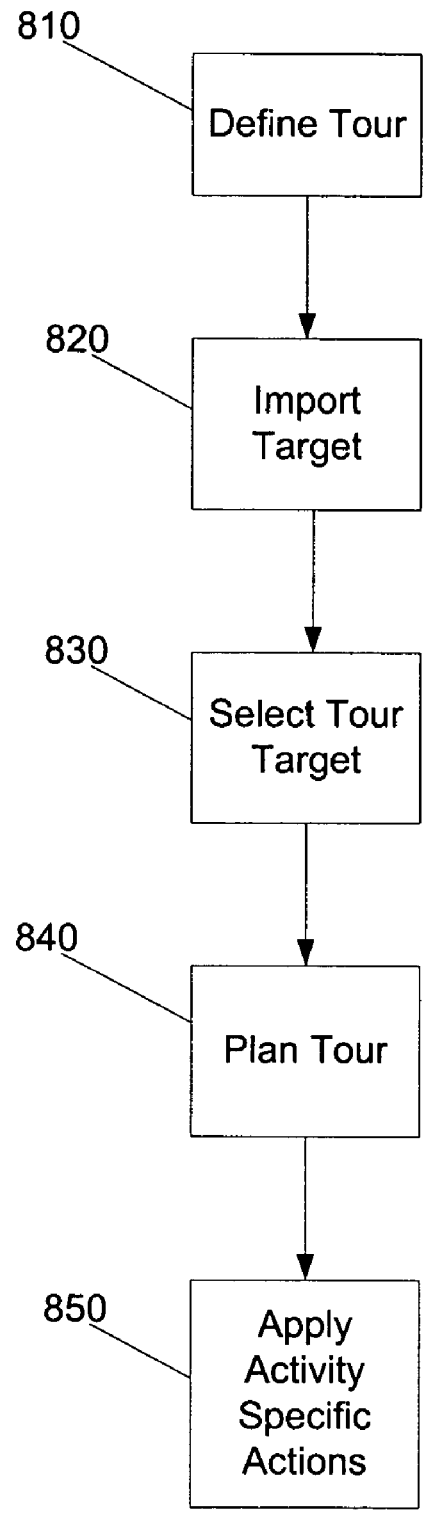
FIG. 8 is a flowchart of one possible work flow for planning a tour of activities.

FIGS. 8-19 depict an exemplary tour planning system and describe its operation from the point of view of the salesperson. FIG. 8 is a diagram of one possible work flow for planning a tour. FIGS. 9-19 are pictures of computer screens of various user interfaces and displays of the tour planning process consistent with the present invention.

Figure 9:
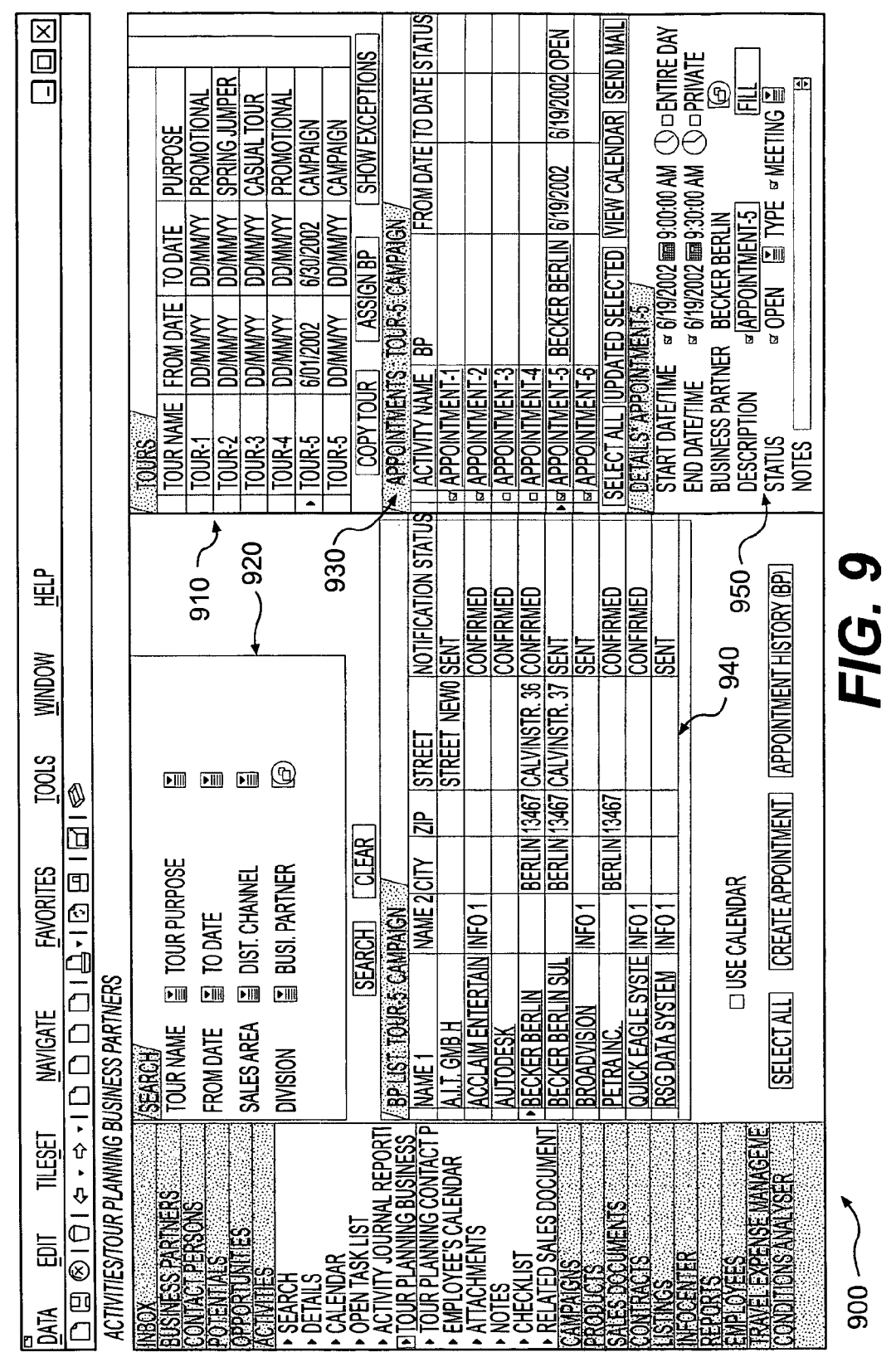

FIG. 9 illustrates one possible computer screen that a salesperson may use to interface with the tour planning system. This interface screen 900 includes a tour window 910 that displays a list of tours, a search window 920 with which a user may search for a tour, an appointment window 930 displaying appointments or activities included in a particular tour, a customer window 940 displaying a list of customers (also referred to as business partners) that are associated with a particular tour, and a details window 950 displaying details about a particular appointment or activity associated with a tour.

Figure 10:
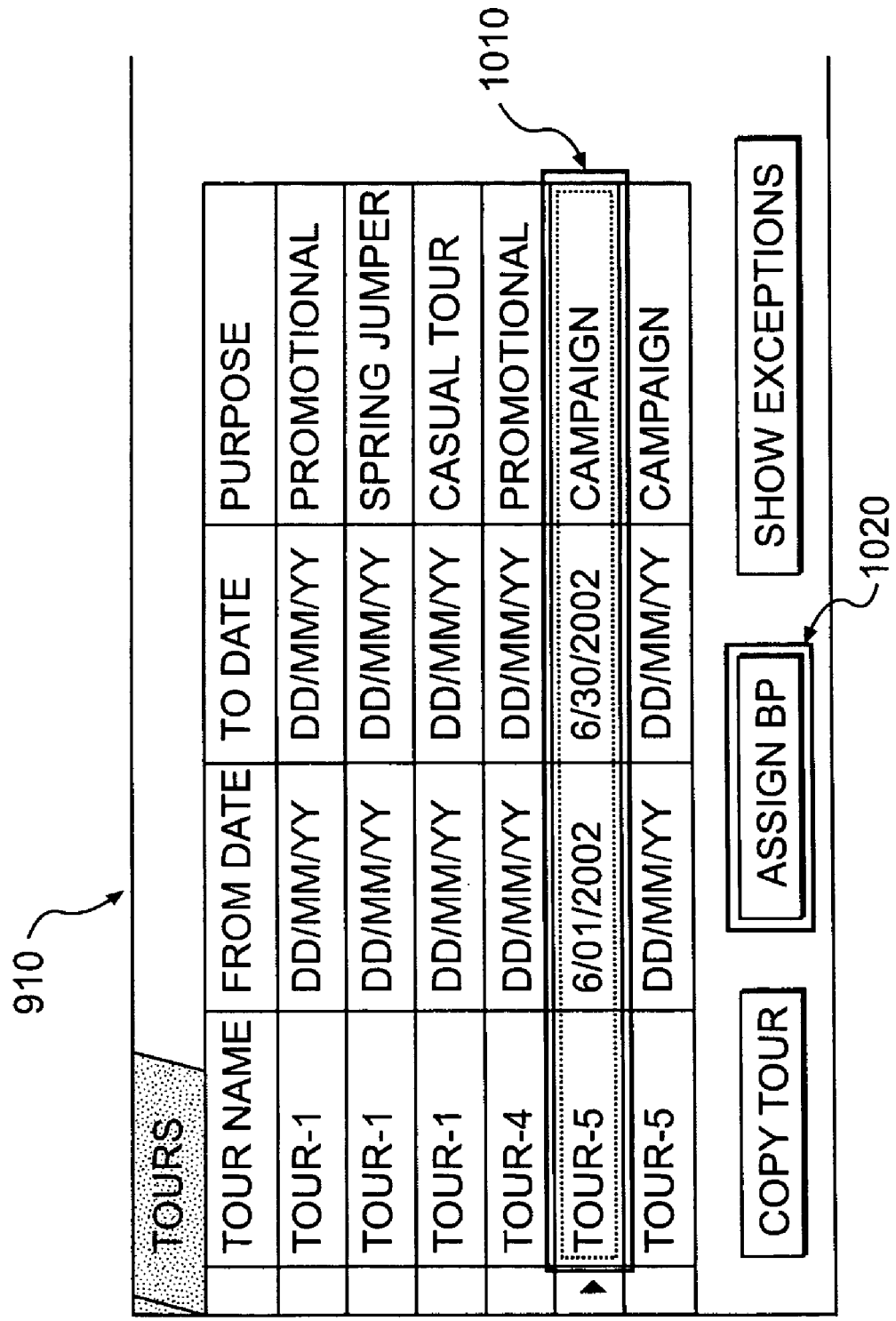
FIG. 10 is a is a computer screen shot of tour definition interface consistent with the present invention.

In FIG. 8, a salesperson uses a tour planning system to plan a tour of activities. First, the salesperson defines the tour 810, for example, by entering background information, such as the name of the tour, the purpose of the tour, a date and time range for the tour, and a territory for the tour. FIG. 10 illustrates one possible computer screen that a salesperson may use to input this information into the tour planning system. In FIG. 10, tour window 910 includes rows, such as row 1010, into which the name of the tour, the purpose of the tour, and the date range of the tour is entered. This information could also be provided automatically from company-wide planning details. In this manner, a company may have a central system that contains company-wide planning information. That information could be linked to the tour planning system so that the tour planning system receives information from the central system.

After basic background information is entered in define tour stage 810, the salesperson identifies customers and planning drivers d in import target stage 820. In FIG. 10, assign BP button 1020 is activated to display the target header window 1100 of FIG. 11. Target header window 1100 displays a list of customers 1110 from which individual customers may be selected. The list of customers 1110 may be searched 1120 to create a smaller group of customers. Alternatively, the entire list of customers 1110 may be selected. The customers selected in target header window 1100 form the customer group from which the tour planning system plans a tour of activities.

Figure 12:
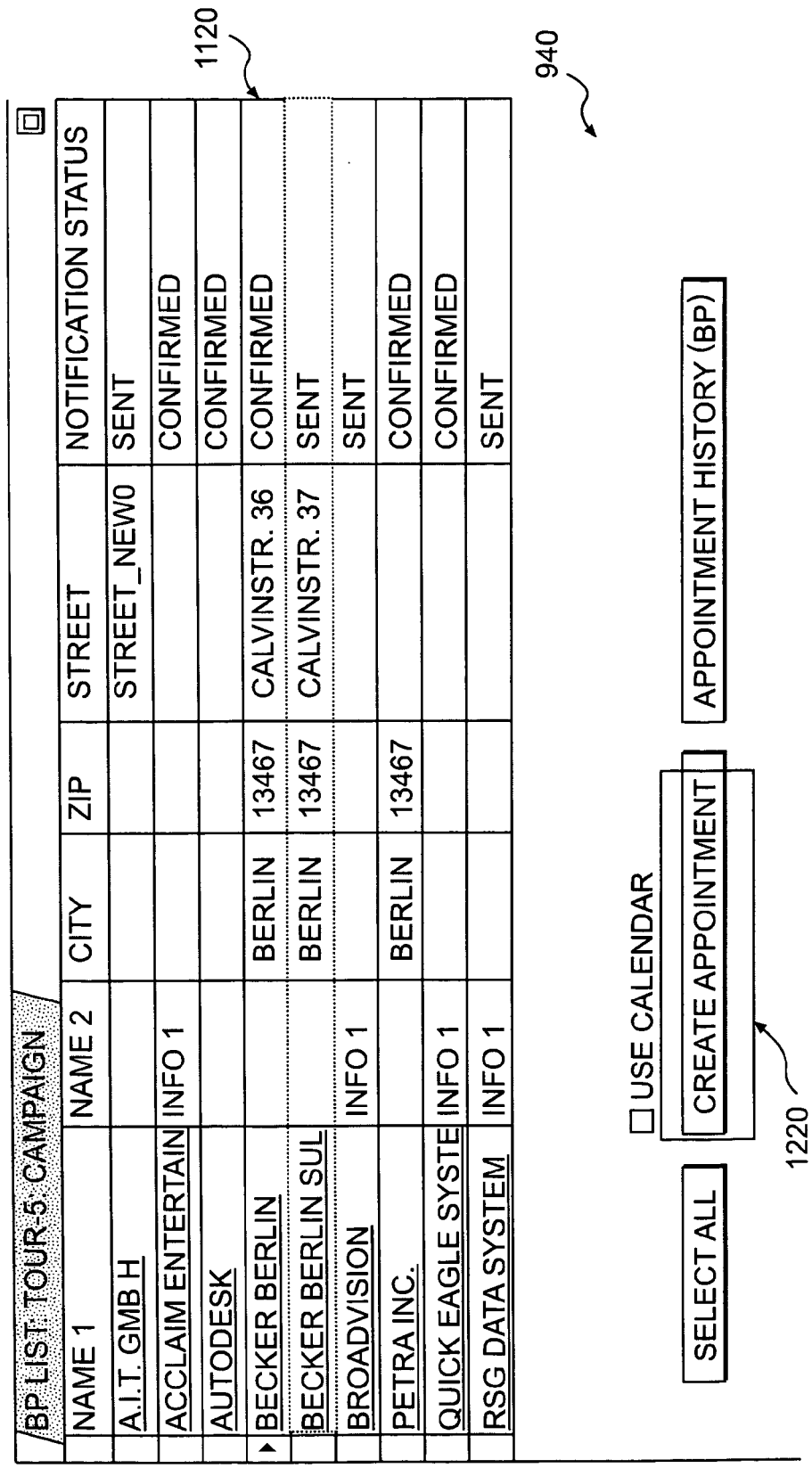
FIG. 12 is a is a computer screen shot of a customer list window interface consistent with the present invention.
Figures 13, 14:
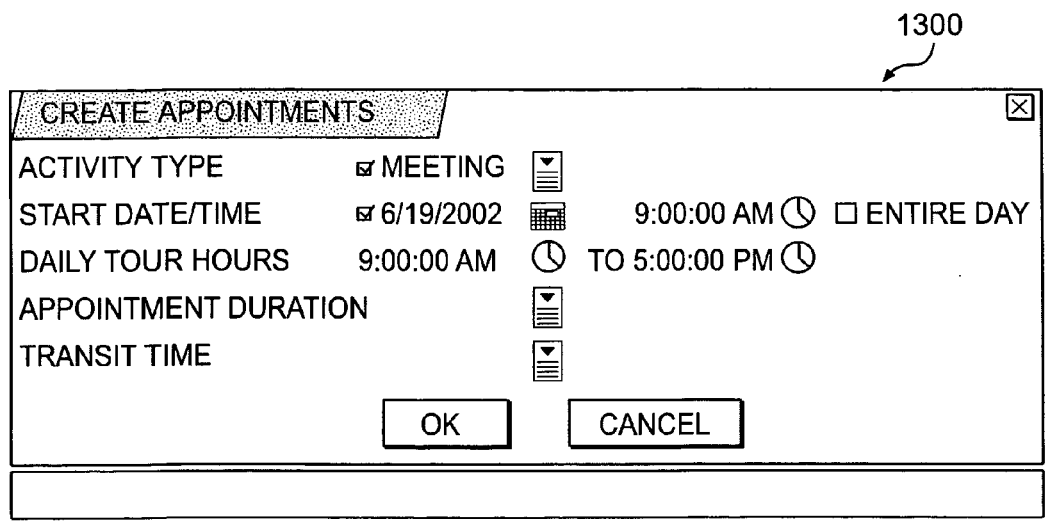
FIG. 13 is a is a computer screen shot of a create appointments window interface consistent with the present invention.
FIG. 14 is a is a computer screen shot of a graphic display window consistent with the present invention.

After the initial customer list is selected in import target stage 820, the salesperson may select a subset of these customers in select tour target stage 830. In select tour target stage 830, appointments can be created with the selected list of customers. In FIG. 12, customer list window 940 displays the subset of selected customers 1210. The salesperson my choose one of the rows of selected customers 1210 to indicate an individual customer. Create appointment button 1220 is activated to display appointments window 1300. In this manner, an appointment may be created with an individual customer. Create appointments window 1300 is a template into which appointment information, such as the date of the appointment, the start and stop times of the appointment, and the desired duration of the appointment, may be entered. The salesperson may enter information indicating desired ranges of times, for example, in create appointments window 1300 so that a tour fitting the desired ranges may be planned. Appointments that are created may be displayed graphically in the control window of FIG. 14 or in list format in appointments window 930 of FIG. 9.

After the subset of customers has been selected in select tour target stage 830, the system plans the tour in plan tour stage 840. As described above, a tour is planned based on customer information, appointment information, and one or more planning drivers. The system may use the customer information for the subset of customers selected in target header window 1100 along with the appointment information entered into appointments window 1300 to plan a tour of activities. The subset of customers selected in target header window 1100 may be much larger in number than the actual list of customers in a planned tour of activities. The tour planning algorithm utilizes customer information and appointment information to plan an optimal or sufficient tour of activities.

Figure 15:
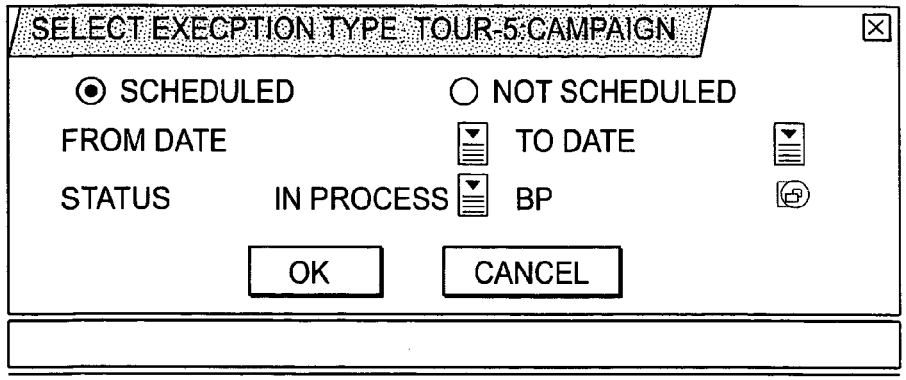
FIG. 15 is a is a computer screen shot of an exceptions window interface consistent with the present invention.
Figure 16:
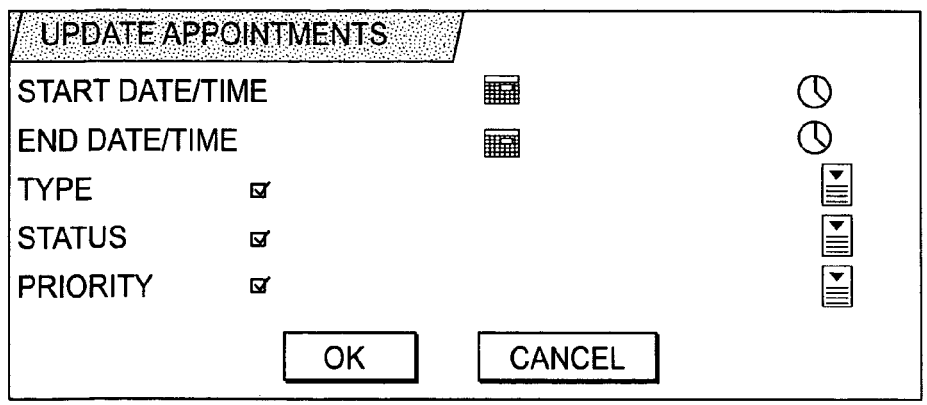
FIG. 16 is a is a computer screen shot of an update appointments window interface consistent with the present invention.
Figure 17:
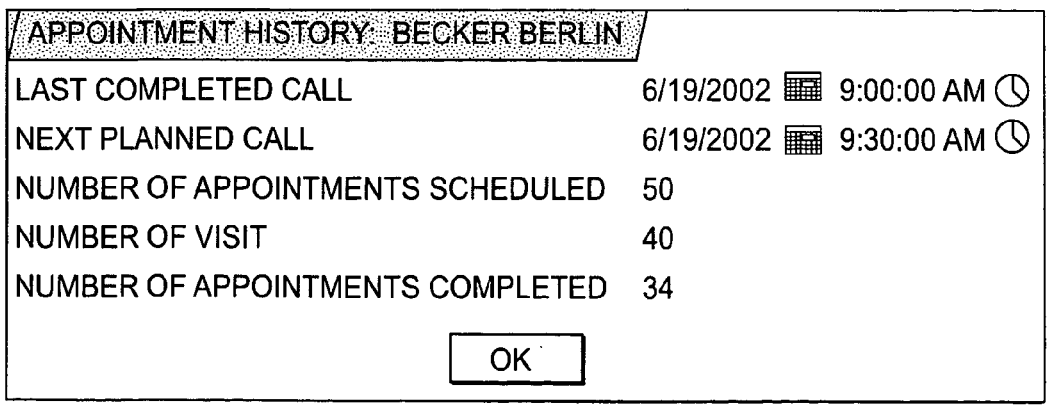
FIG. 17 is a is a computer screen shot of a history display window consistent with the present invention.

The system may also plan a tour of activities based on planning drivers, such as exceptions. FIG. 15 illustrates an exception type window in which a user may select an exception to be a planning driver in the tour planning process. In the exception type window of FIG. 15, a user may select a "scheduled" exception, such as those scheduled customers whose appointments were missed on a prior tour of activities, or a "not scheduled" exception, such as those customers who were not scheduled for an activity because of external factors. The selected exception may then be used as a planning driver. For example, if a salesperson selects a "scheduled" exception to be a planning driver, the tour planning algorithm may plan a tour of activities for those customers whose appointments were missed on a prior tour of activities.

Finally, in apply activity specific actions stage 850, an action specific to a customer or appointment may be applied. In this manner the results obtained from the tour planning algorithm may be altered by a salesperson. For example, a salesperson may wish to change an appointment from a personal visit to a telephone call. This change in the type of activity (from a personal appointment to a telephone call) is an action specific to a particular appointment. In this manner, a salesperson has flexibility in altering a planned tour of activities. The update appointments window of FIG. 16 may be used to enter a change in an appointment.

Figure 18:
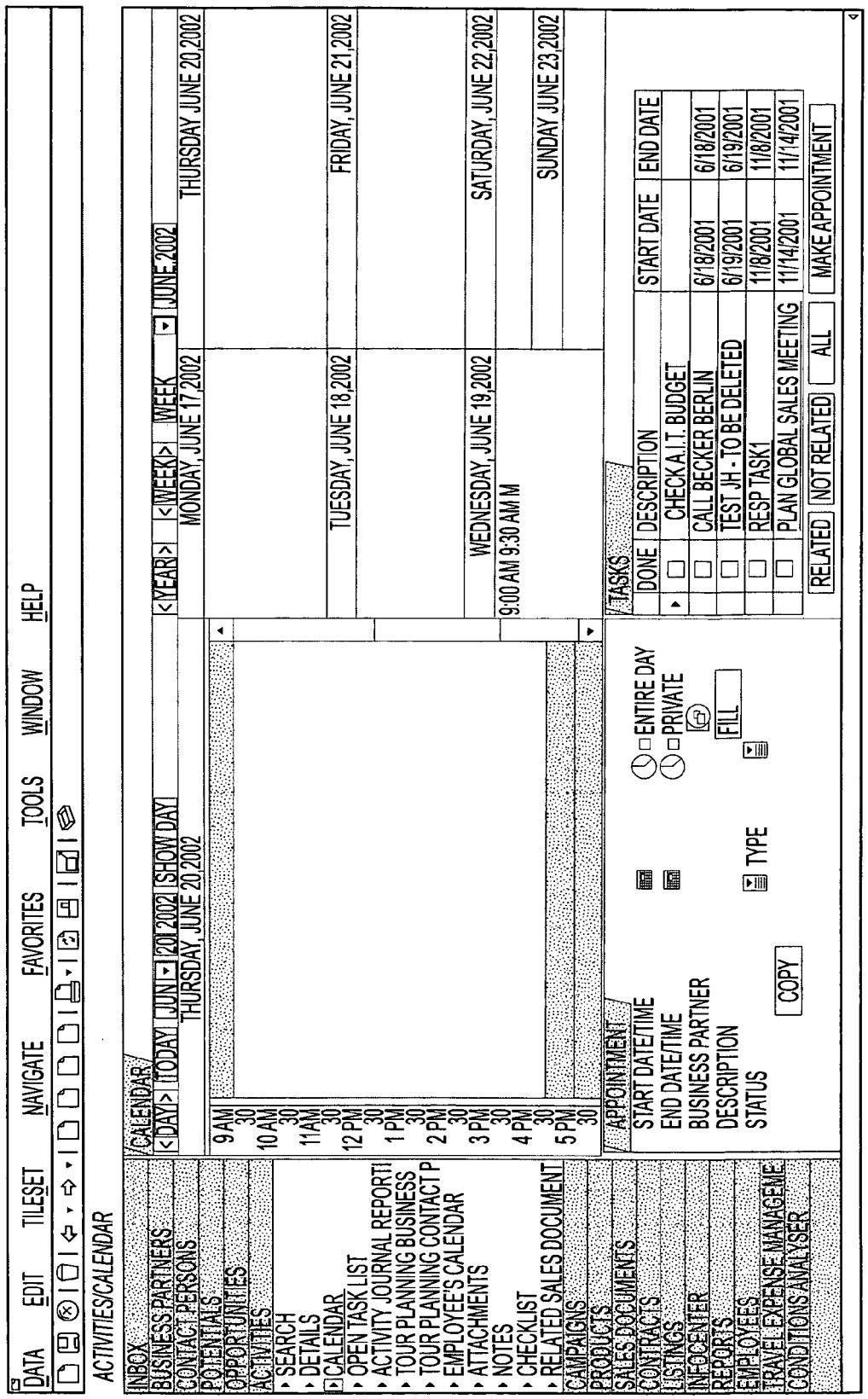
FIG. 18 is a is a computer screen shot of calendar window consistent with the present invention.
Figure 19:
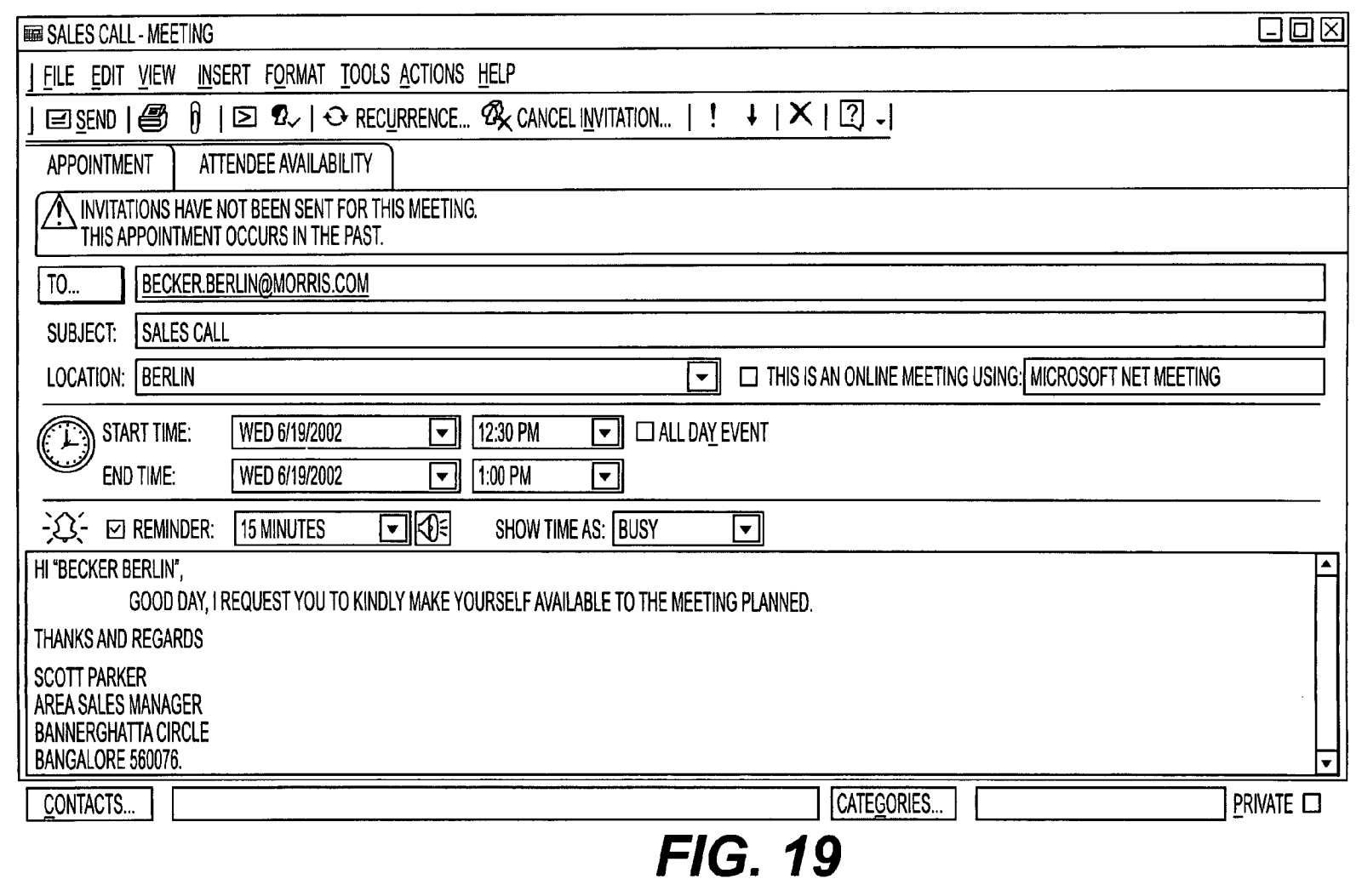

Additional functionality may be provided by the tour planning system to assist a salesperson in applying activity specific actions 850. For example, the appointment history related to a particular customer may be displayed in the history display window of FIG. 17. Additionally, the tour planning system may allow a salesperson to view and organize a calendar as depicted in FIG. 18 or to send an email to a customer to arrange an appointment or remind the customer of a scheduled appointment as depicted in FIG. 19.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in may other ways, using equivalents and alternatives that do not depart from the scope of the following claims. Moreover, unless indicated to the contrary in the preceding description, none of the components described in the implementations is essential to the invention.

What is claimed is:

1. A computer-implemented method of managing scheduled events, the method being implemented by one or more data processors and comprising:
   receiving, by at least one of the data processors, customer information and appointment information via a graphical user interface, the customer information defining a plurality of customers;
   associating, by at least one of the data processors, the customer information and appointment information with a planning driver, the planning driver defining criteria for customers that are appropriate for a particular promotion or opportunity;
   determining, by at least one of the data processors using the planning driver, a subset of the plurality of customers for which a tour of activities may be planned;
   displaying, by at least one of the data processors, information identifying the subset of customers for which the tour of activities may be planned in the graphical user interface;
   receiving, by at least one of the data processors, user-generated input via the graphical user interface selecting less than all of the subset of the customers;
   automatically planning, by at least one of the data processors, a tour of activities based on the customer information, the appointment information, and the customers selected from the subset of the customers, each activity in the tour being associated with a single customer in the subset of customers;
   automatically generating, by at least one of the data processors, one of a status of the tour of activities, a status of an activity, and a status of a customer; and
   reporting, by at least one of the data processors, a summary of one of the tour of activities, the activity, and the customer via the graphical user interface.

2. The method of claim 1, wherein planning the tour of activities further includes:
   receiving, by at least one of the data processors, additional customer information via the graphical user interface;
   receiving, by at least one of the data processors, additional appointment information via the graphical user interface; and
   planning, by at least one of the data processors, a revised tour of activities based on the additional customer information and the additional appointment information.

3. The method of claim 1, further including:
   generating, by at least one of the data processors, an exception based on one of the status of the tour of activities, the status of the activity, and the status of the customer.

4. The method of claim 3, further including:
   identifying, by at least one of the data processors, an opportunity for a follow-up activity.

5. The method of claim 3, further including:
   monitoring, by at least one of the data processors, the status of an activity; and
   monitoring, by at least one of the data processors, the status of a customer.

6. The method of claim 3, further including:
   planning, by at least one of the data processors, a revised tour of activities based on the exception.

7. The method of claim 1, further including:
   monitoring, by at least one of the data processors, the status of an activity;
   monitoring, by at least one of the data processors, the status of a customer;
   generating, by at least one of the data processors, an exception based on one of the status of the tour of activities, the status of the activity, and the status of the customer;
   receiving, by at least one of the data processors, additional customer information via the graphical user interface;
   receiving, by at least one of the data processors, additional appointment information via the graphical user interface; and planning, by at least one of the data processors, a revised tour of activities based on the exception, the additional customer information, and the additional appointment information.

8. A system for managing scheduled events comprising:
a memory; and
a microprocessor coupled to the memory and programmed to:
receive customer information and appointment information;
plan a tour of activities based on the customer information, the appointment information, and a planning driver, each activity in the tour being associated with a single customer in the subset of customers;
generate one of a status of the tour of activities, a status of an activity, and a status of a customer; and
report a summary one of the tour of activities, the activity, or the customer;
wherein the customer information is obtained via a graphical user interface, the graphical user interface displaying a user with a plurality of planning drivers and, in response to a selection of one of the presented planning drivers, displaying an optimized first subset of customers defined by the associated with a selected planning driver using an optimization algorithm, the first subset of customers being selectable by the user for inclusion in the tour of activities, each planning driver establishing criteria for customers for a campaign or promotion.

9. The system of claim 8, wherein the microprocessor is further programmed to:
receive additional customer information;
receive additional appointment information; and
plan a revised tour of activities based on the additional customer information and the additional appointment information.

10. The system of claim 8, wherein the microprocessor is further programmed to:
generate an exception based on one of the status of the tour of activities, the status of the activity, and the status of the customer.

11. The system of claim 10, wherein the microprocessor is further programmed to:
identify an opportunity for a follow-up activity.

12. The system of claim 10, wherein the microprocessor is further programmed to:
monitor the status of an activity; and
monitor the status of a customer.

13. The system of claim 10, wherein the microprocessor is further programmed to:
plan a revised tour of activities based on the exception.

14. The system of claim 8, wherein the microprocessor is further programmed to:
monitor the status of an activity;
monitor the status of a customer;
generate an exception based on one of the status of the tour of activities, the status of the activity, and the status of the customer;
receive additional customer information;
receive additional appointment information; and
plan a revised tour of activities based on the exception, the additional customer information, and the additional appointment information.

15. An article of manufacture comprising:
instructions tangibly embodied on a storage medium for managing scheduled events, the instructions being capable of causing a processor to:
render a graphical user interface comprising a tour window displaying a list of tours, a search window with which a user can search for a tour, an appointment window displaying appointments included in a particular window, a customer window displaying a list of customers associated with a particular tour, and a details window displaying details about a particular appointment associated with a tour, the graphical user interface providing an interface to:
receive customer information and appointment information, the customer information defining a plurality of customers;
associate the customer information, the appointment information, and a previously defined exception with a planning driver, the planning driver defining criteria for customers that are appropriate for a particular promotion or opportunity;
select a subset of the plurality of customers by optimizing a match between the customer information, the appointment information and criteria defined by the planning driver using an optimizing algorithm employing either linear regression or least mean square;
display information identifying the subset of customers for which the tour of activities may be planned in the graphical user interface, each activity in the tour being associated with a single customer in the subset of customers;
receive user-generated input selecting less than all of the subset of the customers;
plan a tour of activities based on the customer information, the appointment information, and the selected customers;
generate one of a status of the tour of activities, a status of an activity, and a status of a customer; and
report a summary one of the tour of activities, the activity, or the customer.

16. The article of manufacture of claim 15, wherein the graphical user interface further provides an interface to:
receive additional customer information;
receive additional appointment information; and
plan a revised tour of activities based on the additional customer information and the additional appointment information.

17. The article of manufacture of claim 15, wherein the graphical user interface further provides an interface to:
generate an exception based on one of the status of the tour of activities, the status of the activity, and the status of the customer.

18. The article of manufacture of claim 17, wherein the graphical user interface further provides an interface to:
identify an opportunity for a follow-up activity.

19. The article of manufacture of claim 17, wherein the graphical user interface further provides an interface to:
monitor the status of an activity; and
monitor the status of a customer.

20. The article of manufacture of claim 17, wherein the graphical user interface further provides an interface to:
plan a revised tour of activities based on the exception.

* * * * *